(12) United States Patent
Ricke et al.

(10) Patent No.: US 12,367,690 B2
(45) Date of Patent: Jul. 22, 2025

(54) METHOD FOR CONTROLLING A VEHICLE IN A DEPOT, TRAVEL CONTROL UNIT, AND VEHICLE HAVING SAID TRAVEL CONTROL UNIT

(71) Applicant: ZF CV Systems Global GmbH, Bern (CH)

(72) Inventors: Janik Ricke, Uetze (DE); Tobias Klinger, Springe (DE)

(73) Assignee: ZF CV Systems Global GmbH, Bern (CH)

( * ) Notice: Subject to any disclaimer, the term of this patent is extended or adjusted under 35 U.S.C. 154(b) by 197 days.

(21) Appl. No.: 17/822,052

(22) Filed: Aug. 24, 2022

(65) Prior Publication Data

US 2022/0413508 A1    Dec. 29, 2022

Related U.S. Application Data

(63) Continuation of application No. PCT/EP2021/055831, filed on Mar. 9, 2021.

(30) Foreign Application Priority Data

Mar. 9, 2020    (DE) .................... 10 2020 106 304.0

(51) Int. Cl.
*G06V 20/64*    (2022.01)
*G05D 1/00*    (2024.01)
(Continued)

(52) U.S. Cl.
CPC ......... *G06V 20/653* (2022.01); *G05D 1/0234* (2013.01); *G05D 1/0246* (2013.01);
(Continued)

(58) Field of Classification Search
CPC .... G06V 20/653; G06V 20/58; G06V 10/147; G06V 10/44; G06V 10/255;
(Continued)

(56) References Cited

U.S. PATENT DOCUMENTS 6,483,429 B1    11/2002 Yasui et al.
2005/0201593 A1    9/2005 Sawada et al.
(Continued)

FOREIGN PATENT DOCUMENTS

DE    600 09 000 T2    3/2005
DE    10 2005 009 814 A1    9/2005
(Continued)

OTHER PUBLICATIONS

EP2634070A1 espacenet MT.*
(Continued)

*Primary Examiner* — Navid Z. Mehdizadeh
*Assistant Examiner* — Oliver Tan
(74) *Attorney, Agent, or Firm* — Walter Ottesen, P.A.

(57) ABSTRACT

A method is for controlling a vehicle in a depot. The method includes: allocating a three-dimensional target object to the vehicle; detecting a three-dimensional object in the environment around the vehicle and determining depth information for the detected three-dimensional object; classifying the detected three-dimensional object on the determined depth information and checking whether the determined three-dimensional object has the same object class as the three-dimensional target object; identifying the detected three-dimensional object if the determined three-dimensional object has the same object class as the three-dimensional target object by detecting an object identifier assigned to the three-dimensional object and checking whether the detected object identifier matches a target identifier assigned to the target object; outputting an approach signal to move the vehicle closer to the detected three-dimensional target object in an automated manner or manually if the object identifier matches the target identifier.

24 Claims, 4 Drawing Sheets

(51) Int. Cl.
  *G06K 7/14*    (2006.01)
  *G06T 7/593*   (2017.01)
  *G06V 10/147*  (2022.01)
  *G06V 10/20*   (2022.01)
  *G06V 10/44*   (2022.01)
  *G06V 10/764*  (2022.01)
  *G06V 20/58*   (2022.01)

(52) U.S. Cl.
  CPC ............ *G06K 7/1417* (2013.01); *G06T 7/593* (2017.01); *G06V 10/147* (2022.01); *G06V 10/255* (2022.01); *G06V 10/44* (2022.01); *G06V 10/764* (2022.01); *G06V 20/58* (2022.01); *G06T 2207/10012* (2013.01); *G06T 2207/30261* (2013.01)

(58) Field of Classification Search
  CPC .................. G06V 10/764; G06T 7/593; G06T 2207/10012; G06T 2207/30261; G05D 1/0234; G05D 1/0246; G06K 7/1417
  See application file for complete search history.

(56) References Cited

U.S. PATENT DOCUMENTS

| | | |
|---|---|---|
| 2005/0281436 A1 | 12/2005 | Gehring et al. |
| 2009/0192647 A1* | 7/2009 | Nishiyama ............. G06V 20/56 901/30 |
| 2015/0286878 A1 | 10/2015 | Molin et al. |
| 2018/0165524 A1 | 6/2018 | Molin et al. |
| 2018/0181142 A1 | 6/2018 | Baran |
| 2018/0204072 A1 | 7/2018 | Al Rasheed et al. |
| 2018/0217608 A1* | 8/2018 | Huger .................... G06V 20/56 |
| 2019/0196491 A1 | 6/2019 | Balogh et al. |
| 2020/0327343 A1* | 10/2020 | Lund ....................... H04W 4/46 |
| 2021/0276557 A1* | 9/2021 | Gupta ..................... B60D 1/36 |
| 2022/0019815 A1 | 1/2022 | Molin et al. |
| 2022/0187840 A1 | 6/2022 | Balogh et al. |

FOREIGN PATENT DOCUMENTS

| | | | |
|---|---|---|---|
| DE | 10 2006 035 929 A1 | 2/2008 | |
| DE | 10 2015 105 248 A1 | 10/2015 | |
| DE | 10 2016 116 857 A1 | 3/2018 | |
| DE | 10 2018 210 340 A1 | 1/2020 | |
| DE | 10 2018 210 356 A1 | 1/2020 | |
| EP | 2634070 A1 * | 9/2013 | ........... B62D 15/028 |
| WO | 2016/164118 A2 | 10/2016 | |

OTHER PUBLICATIONS

Raspbery Pi Garage Door opener Stokes 2015 (Year: 2015).*
International Search Report of the European Patent Office dated Jun. 15, 2021 for international application PCT/EP2021/055831 on which this application is based.
Translation of the Written Opinion of the International Searching Authority dated Jun. 15, 2021 for international application PCT/EP2021/055831 on which this application is based.

* cited by examiner

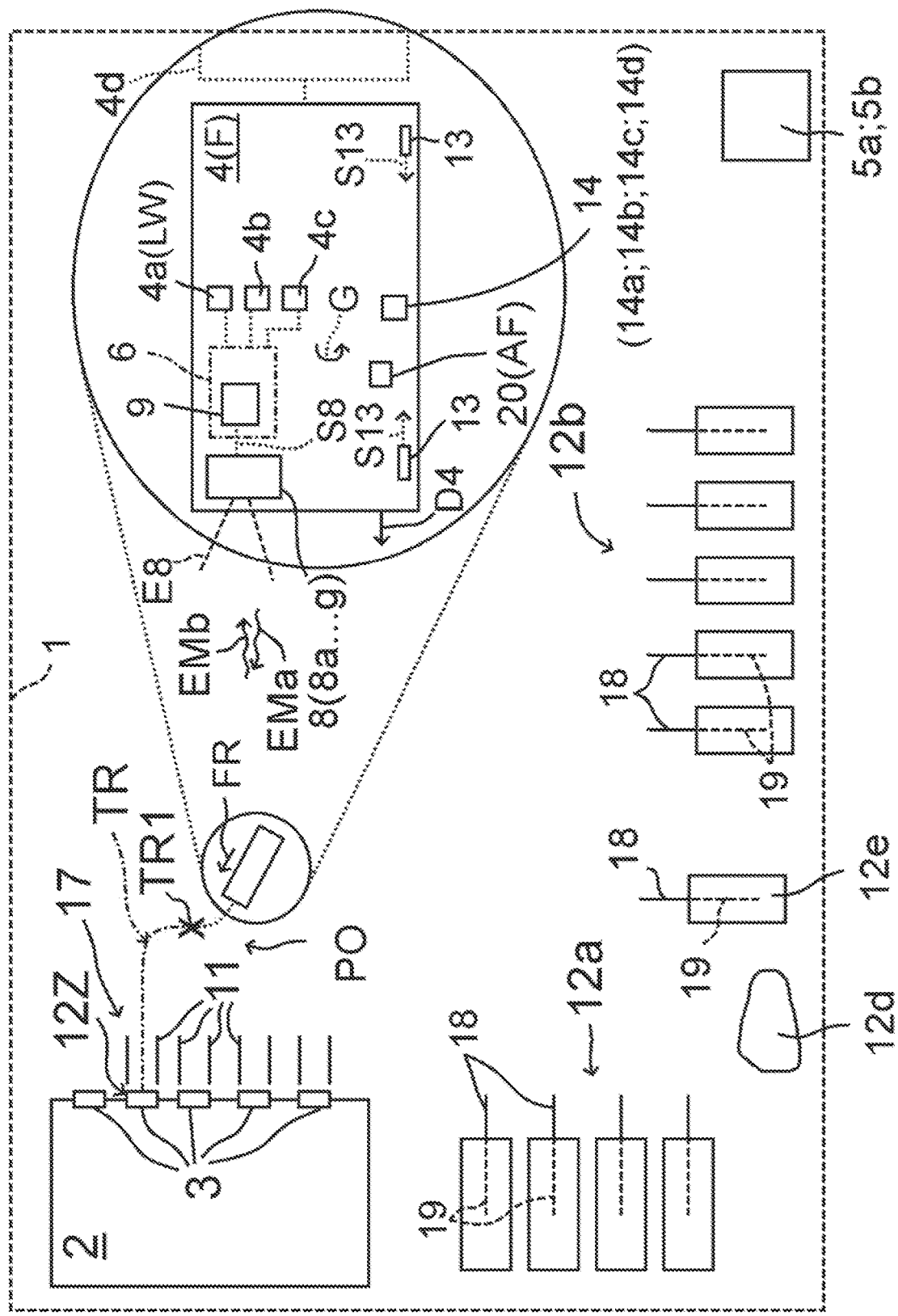

METHOD FOR CONTROLLING A VEHICLE IN A DEPOT, TRAVEL CONTROL UNIT, AND VEHICLE HAVING SAID TRAVEL CONTROL UNIT

CROSS REFERENCE TO RELATED APPLICATIONS

This application is a continuation application of international patent application PCT/EP2021/055831, filed Mar. 9, 2021 designating the United States and claiming priority from German application 10 2020 106 304.0, filed Mar. 9, 2020, and the entire content of both applications is incorporated herein by reference.

TECHNICAL FIELD

The disclosure relates to a method for controlling a vehicle in a depot, to a travel control unit for carrying out the method, and to a vehicle.

BACKGROUND

It is known from the prior art to move a vehicle closer to a station or an object, for example a ramp at a depot, in an automated manner or manually. US 2019/0196491 and US 2022/0187840 describe, for example, that the vehicle travels in an automated manner from one station to another station in a depot on command. However, the correct ramp or the path along which the vehicle moves within the depot is not defined by the vehicle itself, but centrally by a management system.

It is not described that the vehicle itself searches for the ramp assigned to it and approaches it automatically. In practice, it is not uncommon for 20 ramps to be in close proximity to each other, and therefore it is time-consuming to find an assigned ramp in a fully automated solution without a centralized specification. If, for example, machine learning using pattern recognition is used for this purpose, high computing power and a large database are required. In addition, machine learning based on images is usually only able to reproduce the position of objects in the 2D image space, which can result in inaccuracies.

The same applies to an autonomous coupling process to a parked trailer or a shunting process under a swap body, in which the assigned trailer or swap body, respectively, must first be identified in a time-consuming manner before the vehicle can approach.

If a vehicle is to drive in an automated manner in a depot, corresponding patterns must be recognized by an environment detection system in order to avoid collisions with other objects. Mono cameras or stereo cameras are usually used to identify patterns in the environment. Furthermore, it is known how the structure of the scene can be determined in 3D with the help of a mono camera by the forward or backward movement of a vehicle on which the mono camera is mounted using photogrammetric methods (so-called Structure from Motion (SfM)).

In US 2018/0204072 A1, for example, it is provided to fix cameras to a trailer of a vehicle combination. Furthermore, vehicle dynamics sensors are provided which output odometry data relating to the vehicle movement, for example a vehicle speed. The camera data output from the camera is compared with the odometry data, wherein the odometry data is used to compensate for the vehicle motion when processing the camera data to create images. Camera data from different cameras may also be added in the process.

In US 2005/0201593 it is provided to process camera data together with odometry data output by wheel speed sensors to determine a yaw rate. In U.S. Pat. No. 6,483,429, image processing taking into account odometry data of the vehicle is further provided to assist the driver in parking. In US 2015/0286878, US 2018/0165524 and US 2022/0019815, an image from a first camera is processed together with an image from a second camera in conjunction with odometry data, wherein the cameras may be arranged on a trailer and a towing vehicle of a multi-part vehicle. The images captured by the various cameras and output in the form of camera data are combined. From this, a combined image of the environment is generated, wherein when cornering, for example, an articulation angle is also taken into account, which characterizes the viewpoints of the cameras relative to one another. A bird's-eye view can be superimposed over the complete multi-part vehicle to display the environment around the vehicle, for example to enable parking assistance.

In US 2018/0181142 an omnidirectional camera is provided that detects object points of objects in an environment of the vehicle and outputs camera data depending thereon. With the aid of a control device in the vehicle, the camera data are processed with the inclusion of recorded odometry data, wherein the odometry data, for example from wheel speed sensors, position sensors or a steering angle sensor, are received via the data bus of the vehicle. The object points in the environment of the vehicle that are of interest are recognized by the camera, and a distance to the object assigned to the detected object point is determined by the control device on the basis of the odometry data. For this purpose, a plurality of images are captured via the one camera, wherein the images are captured from different viewpoints with overlapping fields of view. By tracking object points, depth information of the scene can be estimated using triangulation and bundle adjustment. The camera data are also presented in the form of images on a display for the driver. The images as well as the determined distance are used to facilitate the maneuvering of a passenger car as a towing vehicle to a trailer in order to couple these. Other objects such as the ground, pedestrians, et cetera, can indeed be determined, but this requires sufficient movement of the vehicle, as this is the only way to set different viewpoints for the camera.

SUMMARY

It is an object of the disclosure to provide a method for controlling a vehicle in a depot, with which method an object assigned to the vehicle can be identified and located with little effort and to which the vehicle can subsequently be moved closer. It is furthermore an object to provide a travel control unit as well as a vehicle.

In accordance with the disclosure, therefore, a method for controlling a vehicle in a depot is provided, the method having at least the following steps:

allocating a three-dimensional target object, for example a ramp for loading and/or unloading a cargo, a parked trailer, a swap body, a container or a bulk material storage location, to the vehicle. This can be done manually by a dispatcher, for example, or in an automated manner by a management system that monitors or controls or manages the operations in the demarcated area.

The method further includes the steps of:

detecting a three-dimensional object in the environment of the vehicle and determining depth information for the detected three-dimensional object, wherein the depth information spatially characterizes the three-dimensional object;

classifying the detected three-dimensional object on the basis of the determined depth information and checking whether the determined three-dimensional object has the same object class as the assigned three-dimensional target object;

identifying the detected three-dimensional object if the determined three-dimensional object has the same object class as the assigned three-dimensional target object by detecting an object identifier assigned to the three-dimensional object and checking whether the detected object identifier matches a target identifier assigned to the target object;

outputting an approach signal to move the vehicle closer to the detected three-dimensional target object in an automated manner or manually if the object identifier matches the target identifier, wherein the vehicle is controlled depending on the approach signal preferably via a drive system and/or a brake system and/or a steering system in an automated manner or manually along a specified trajectory for approaching the three-dimensional target object.

Advantageously, the vehicle itself can thus check in several steps whether a three-dimensional object located in the environment is assigned for an approach, wherein the three-dimensional object can be reliably recognized or classified with little effort by determining the depth information and subsequently can also be easily identified and located relative to the vehicle.

This means that the approach process at the depot can be fully automated in the case of automated or autonomous control of the vehicle, or at least supported in the case of manual control of the vehicle, without a centralized specification of the path having to be made. Rather, the destination of the vehicle is automatically searched for itself during an automated or manual journey across the depot starting from a certain point, for example in an area of the relevant three-dimensional object (ramp, swap body, et cetera), wherein only the specification or the assignment of the destination object or the destination identifier is necessary. Automated or autonomous control of the vehicle is understood here to mean control without human intervention, that is, an autonomy level of four or five, that is, no person in the vehicle is required for control.

In this context, a depot is understood to be a public, semi-public or non-public demarcatable operating area in which vehicles, in particular commercial vehicles, are controlled in an automated manner or manually, for example to pick up or unload cargo. In addition, parked trailers can also be coupled or parked. Accordingly, a depot can, for example, be part of a supermarket, a furniture store, a factory facility, a port, a forwarding agent's premises, a DIY store, an intermediate storage facility or a company premises.

Preferably, it can further be provided that a three-dimensional object in the environment around the vehicle is detected via a mono camera and/or a stereo camera, wherein the determination of depth information of the detected three-dimensional object follows by triangulation from at least two recorded images, wherein the images are recorded with the mono camera and/or with the stereo camera from at least two different viewpoints.

Accordingly, different methods can be used to spatially capture and evaluate the scene. When using a mono camera, the so-called structure-from-motion method (SfM) must be used, with which the environment or the object in question is recorded from at least two different viewpoints in order to extract depth information through triangulation.

Preferably, the mono camera can be brought into the at least two different viewpoints by a change, controlled in an automated manner, in the driving dynamics of the entire vehicle and/or by an actuator system, wherein the actuator system can adjust the mono camera into the different viewpoints independently of the driving dynamics of the vehicle. In this way, the SfM process can be carried out by the vehicle movement itself or by an active adjustment, wherein an active adjustment has the advantage that the depth information of an object can be extracted, for example, even when the vehicle is stationary. Actuator systems can be, for example, a camera adjustment system that directly adjusts the camera, an air suspension system (ECAS), any chassis adjustment system or a component adjustment system (driver's cab, aerodynamic elements, et cetera).

According to an alternative or supplementary embodiment, it is provided that a three-dimensional object in the environment around the vehicle is detected via a LIDAR sensor and/or a time-of-flight camera and/or a structured-light camera and/or an imaging radar sensor, wherein depth information of the detected three-dimensional object is determined by a propagation measurement of emitted electromagnetic radiation and reflected electromagnetic radiation, with which a detection range of the particular sensor is scanned. This means that not only can imaging sensors be used to provide the depth information for the recognition and identification process, but also sensors that can perform, for example, a spatially resolved distance measurement by determining the propagation difference between emitted and reflected radiation. This also allows the method to be used more flexibly in different environmental conditions, for example in darkness.

Preferably, it can further be provided that an object shape and/or an object contour of the detected three-dimensional object is determined on the basis of the depth information, and an object class and/or a pose, that is, a position and an orientation of the three-dimensional object, relative to the vehicle is assigned to the detected three-dimensional object depending on the object shape and/or the object contour. Thus, based on the triangulation or the evaluation of the spatially resolved propagation measurement, a simple classification of the detected three-dimensional object can be performed, so that in a first step it can be recognized without much effort whether the object is a relevant object that could be the target object, which is checked by the subsequent identification. The pose can also be used to precisely locate the object in question, wherein the pose can be determined, for example, by a model-based comparison in which a model of a three-dimensional object is compared with the object shape or the object contour determined from the spatially resolved depth information.

The identification is preferably carried out by sensor, in that the object identifier is detected by a sensor. According to one variant, t can be provided that as object identifier a 2D marker, for example a letter and/or number and/or a QR code and/or an Aruco marker, and/or a 3D marker can be detected, wherein the 2D marker and/or the 3D marker is located on or adjacently to the detected three-dimensional object. In this way, an object identifier assigned to the object can be captured in a simple manner via, for example, a mono camera or a stereo camera, and can then be compared with the target identifier.

According to a further variant, it can be provided that an opening state of a ramp gate of a ramp is detected as an object identifier if a ramp is detected as a three-dimensional object, and an opened ramp gate can be specified as a target identifier for the target object. Accordingly, for example, only the ramp gate can be opened by the dispatcher or the management system in order to inform the vehicle or the driver of the allocated ramp.

In principle, other object identifiers can also be used, for example Bluetooth transmitters, lamps, et cetera, via which information can be transmitted to the vehicle or driver in an appropriately coded form in order to determine whether it is the allocated three-dimensional target object.

In all cases, it is preferably assumed that the object identifier matches the target identifier if they are identical in content or if they contain the same information. For example, a number or letter can be allocated as the target identifier, which is then encoded in the object identifier in question, for example in a QR code or an Aruco marker. In the vehicle, it is then only necessary to determine whether the object identifier matches the target identifier in terms of content or the information transmitted, and thus whether it points to the allocated target object.

Preferably, it can further be provided that a search routine is performed if the object identifier of the detected three-dimensional object does not match the target identifier of the allocated target object, wherein, as part of the search routine, successive further three-dimensional objects are detected, classified, and identified and located in the depot until the object identifier of the detected three-dimensional object matches the target identifier of the allocated target object. This allows the vehicle or driver to find itself the target object allocated to it in an easy-to-perform search routine.

Preferably, it can further be provided in this respect that the vehicle is moved in an automated manner and/or manually in a direction of travel as part of the search routine in order to detect successive further three-dimensional objects, wherein the direction of travel is defined depending on the detected object identifier which does not match the target identifier, in such a way that object identifiers for three-dimensional objects which approximate the target identifier are determined in ascending or descending ranking order. Thus, the allocated target identifier or the target object can be found in a controlled or efficient manner.

Preferably, it can also be provided that the vehicle is first controlled in an automated manner and/or manually to a starting point of the trajectory after the approach signal has been output. Accordingly, a rough orientation or a turning maneuver can first be performed to bring the vehicle into a position that simplifies a controlled approach to the particular target object or the determination of a trajectory for same.

Preferably, it can be provided here that the trajectory and/or the starting point is dependent on the object class and/or the pose of the three-dimensional target object and is dependent on the vehicle, in particular a coupled trailer. Accordingly, the automated and/or manual control of the vehicle takes into account whether the vehicle is loaded or unloaded from the side or from the rear, for example, or whether the vehicle is a two-part vehicle. This further optimizes the approach process. In the case of two-part vehicles, particular consideration is given to the type of trailer involved in combination with the towing vehicle, for example semi-trailer, center-axle trailer, or drawbar trailer or turntable trailer.

Preferably, the trajectory can also be specified depending on a line assigned to the three-dimensional target object. For example, one or two lines on the ground running 90° to a ramp can be assigned to the ramp, which can be used to orient the trajectory in order to avoid entering the area of neighboring ramps, for example. For a trailer or a swap body, virtual lines can also be assigned on the basis of the determined object contour or object shape, on the basis of which the trajectory is oriented in order to facilitate the approach process.

In all embodiments, it may preferably be provided that, in the case of manual control of the vehicle, travel instructions are output via a display device depending on the approach signal in order to allow the vehicle to be moved closer to the three-dimensional target object manually. The control of the vehicle can therefore also include the fact that the driver receives instructions, depending on the approach signal, regarding how he must steer the vehicle optimally. This allows the driver to steer to the correct object after allocation of a target object, regardless of the language used at the depot.

In accordance with the disclosure, a travel control unit is further provided, which is set up in particular for carrying out the method according to the disclosure, wherein the travel control unit is configured to carry out at least the following steps:

detecting a three-dimensional object in the environment of a vehicle and determining depth information of the detected three-dimensional object;
  classifying the detected three-dimensional object on the basis of the determined depth information and checking whether the determined three-dimensional object has the same object class as a three-dimensional target object allocated to the vehicle;
  identifying the detected three-dimensional object when the determined three-dimensional object has the same object class as the three-dimensional target object by detecting an object identifier assigned to the three-dimensional object and checking whether the detected object identifier matches a target identifier assigned to the target object, and
  outputting an approach signal to move the vehicle closer to the detected three-dimensional target object in an automated manner or manually if the object identifier matches the target identifier. Preferably, the travel control device is further configured to influence the driving dynamics of the vehicle in an automated manner, for example via a steering system and/or a braking system and/or a drive system of the vehicle.

In accordance with the disclosure, there is further provided a vehicle with a travel control unit according to the disclosure for controlling the vehicle in an automated manner or manually depending on an approach signal.

BRIEF DESCRIPTION OF THE DRAWINGS

The invention will now be described with reference to the drawings wherein:

FIG. 1 is a schematic view of a depot with a vehicle;

DESCRIPTION OF THE PREFERRED EMBODIMENTS

Figure 1B:
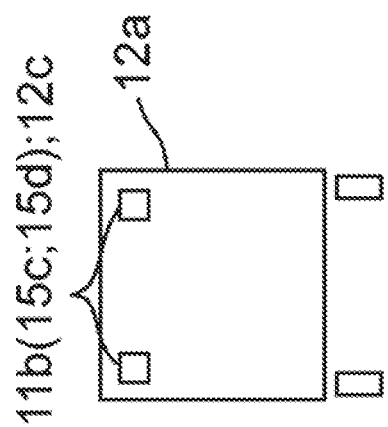
FIG. 1B shows a detailed view of a trailer in the depot according to FIG. 1.
Figure 1C:
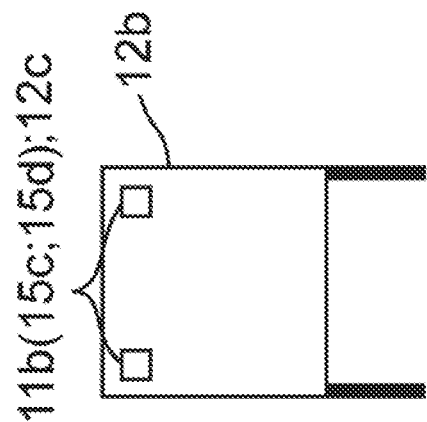
FIG. 1C shows a detailed view of a swap body in the depot according to FIG. 1.
Figure 1A:
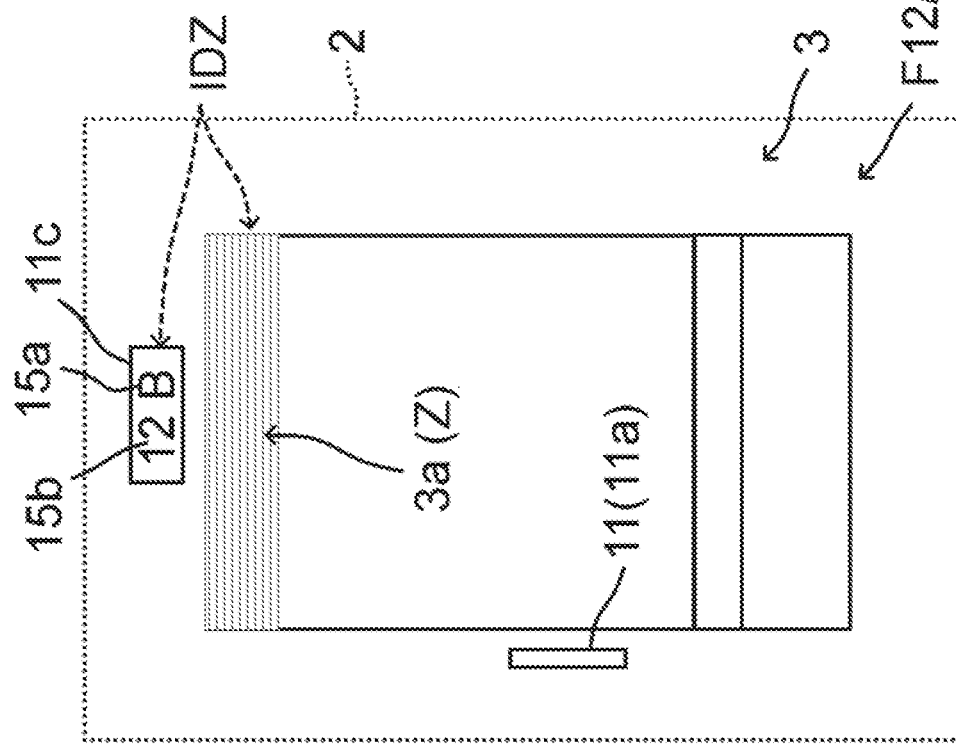
FIG. 1A is a detailed view of a ramp on the depot according to FIG. 1.

FIG. 1 schematically shows a depot 1 with a building 2, wherein the building 2 has a plurality of ramps 3 for loading and unloading a vehicle 4, in particular a commercial vehicle, which may be single or multi-part vehicle (with coupled trailer(s) 4d). A vehicle 4 located in the depot 1 can thereby move to one of the ramps 3 in an automated or manually controlled manner in order to load there a cargo F to be transported and/or in order to unload there a transported cargo F.

Figure 3:
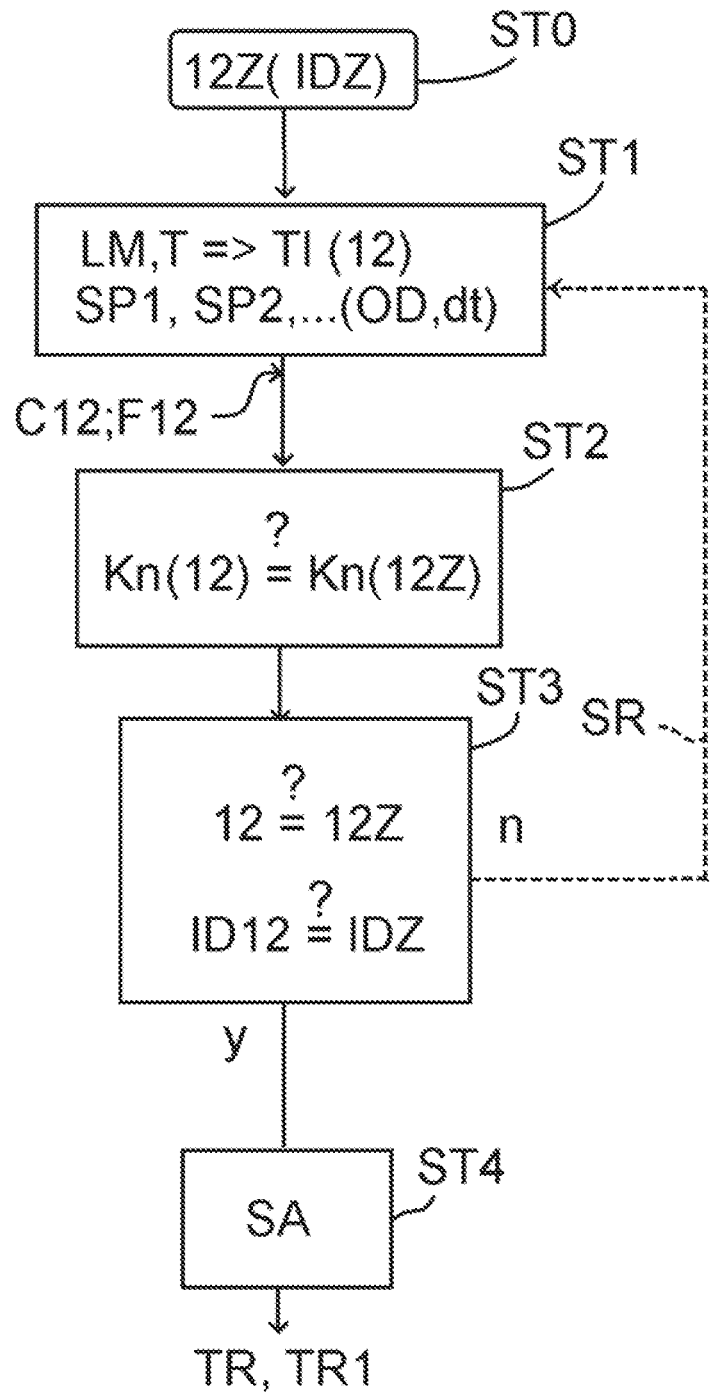

The control of the vehicle 4 to the ramps 3 is initiated here by a management system 5a assigned to the depot 1 or by a dispatcher 5b in an initialization step ST0 (see FIG. 3), wherein the management system 5a or the dispatcher 5b can communicate with the vehicle 4 in any way at least once before or after the latter reaches the depot 1. Manual initiation of automated control from the vehicle 4 is also possible. For automated control of the vehicle 4 at the depot 1, the vehicle 4 has a travel control unit 6 that is configured to influence the driving dynamics D4 of the vehicle 4 in a targeted automated manner, for example via a steering system 4a, a braking system 4b and a drive system 4c. However, the driving dynamics D4 can also be influenced correspondingly manually by a driver, wherein the driver can receive travel instructions AF from the travel control unit 6 via a display device 20.

In addition, however, the vehicle 4 can also be at the depot 1 in order to couple to a parked trailer 12a, controlled in an automated manner or manually, to maneuver under a swap body 12b, to drive to a bulk material location 12d or a container 12e, which is also specified in a corresponding manner by the management system 5a or by the dispatcher 5b.

Furthermore, the vehicle 4 has an environment detection system 7 that has sensors 8, for example a mono camera 8a, a stereo camera 8b, preferably each in a fish-eye configuration with a viewing angle of approximately 180°, and/or an infrared sensor 8c, a LIDAR sensor 8d, a time-of-flight camera 8e, a structured-light camera 8f or an imaging radar sensor 8g, et cetera, and an evaluation unit 9. The evaluation unit 9 is capable of recognizing objects 10 in the environment U around the vehicle 4 from sensor signals S8 output by the sensors 8. For example, two-dimensional objects 11, in particular lines 11a, 2D markers 11b, signs 11c, et cetera, or three-dimensional objects 12, for example a ramp 3, a parked trailer 12a, a swap body 12b, a 3D marker 12c, a bulk material location 12d, a container 12e, et cetera, can be recognized as objects 10.

By means of corresponding evaluation algorithms, the evaluation unit 9 is thereby able, for example, to recognize the two-dimensional objects 11 from one or more images B generated from the sensor signals S8, for example by means of line detection, or to extract the three-dimensional objects 12 by means of triangulation T and thereby also to obtain depth information TI about the three-dimensional object 12. This is particularly the case when using the mono camera 8a or the stereo camera 8b.

In the case of the LIDAR sensor 8d, the time-of-flight camera 8e, the structured-light camera 8f and the imaging radar sensor 8g, on the other hand, the three-dimensional objects 12 are recognized or the depth information TI is generated in the evaluation unit 9 by a propagation measurement LM between emitted electromagnetic radiation EMa and reflected electromagnetic radiation EMb. This propagation measurement LM is carried out here by scanning a specific detection area E8 of the particular sensor 8d, 8e, 8f, 8g with the emitted electromagnetic radiation EMa in order to be able to detect the depth information in a spatially resolved manner.

The recognition of three-dimensional objects 12 is used within the scope of the method according to the disclosure to find a target object 12Z on the depot 1 allocated to the vehicle 4 in the initialization step ST0.

For this purpose, in a first step ST1, depth information TI about a detected three-dimensional object 12 is extracted by recording the environment U with a stereo camera 8b using the triangulation T. Alternatively (or additionally), however, the depth information TI can also be generated from corresponding propagation measurements LM with the aid of the LIDAR sensor 8d, the time-of-flight camera 8e, the structured-light camera 8f, or the imaging radar sensor 8g. A mono camera 8a can also be used to take multiple images of the environment U and extract the required depth information TI from the multiple images B using the so-called structure-from-motion (SfM) method.

Figure 2A:
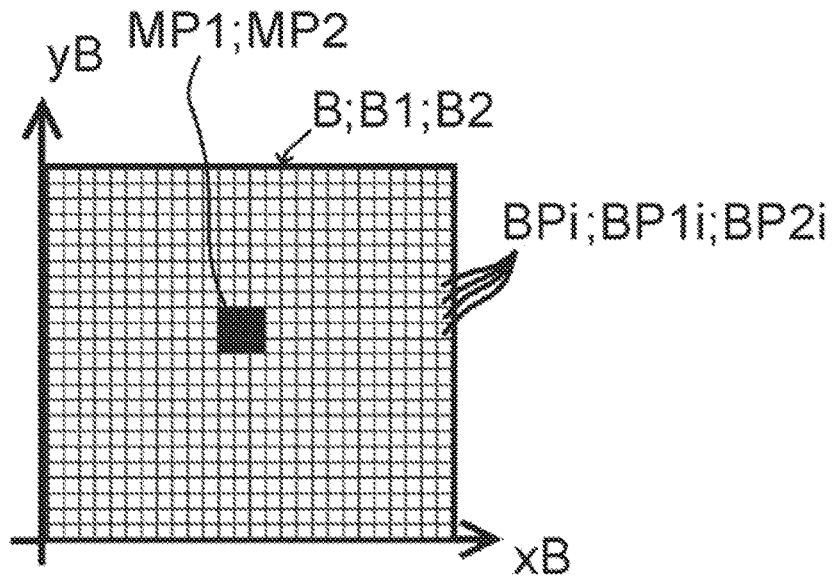
FIG. 2A shows an image recorded by a mono camera.
Figure 2B:
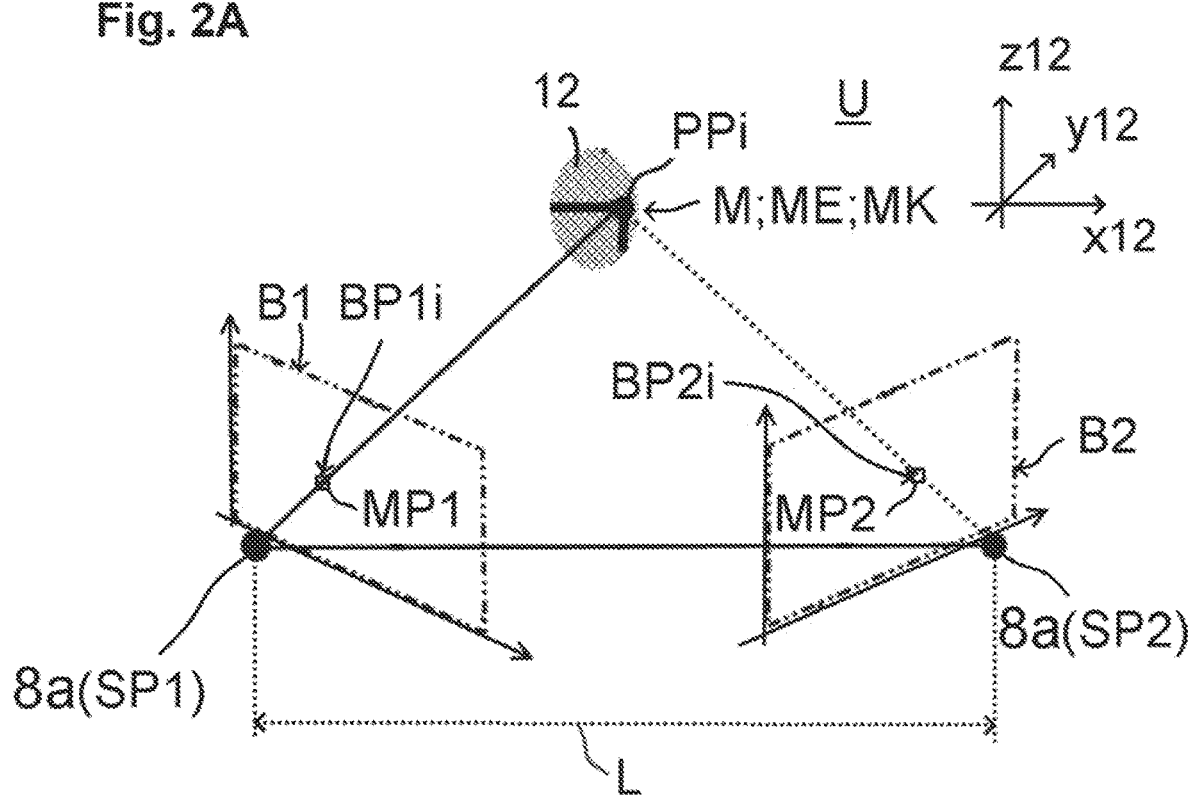
FIG. 2B shows the recorded image of an object point with a mono camera from different viewpoints; and, FIG. 3 shows a flow diagram of the method according to the disclosure.

For the SfM method, the three-dimensional object 12 in question is photographed by a mono camera 8a from at least two different viewpoints SP1, SP2 (see FIG. 2B). By triangulation T, the depth information TI with respect to the three-dimensional object 12 can then be obtained. In this process, image coordinates xB, yB are determined with respect to at least one first image point BP1i in a first image B1 and with respect to at least one second image point BP2i in a second image B2, each of which image points is assigned to the same object point PPi on the three-dimensional object 12.

In order to simplify the process, a certain number of image points BP1i, BP2i in their respective images B1, B2 can be combined into a feature point MP1, MP2 (see FIG. 2A), wherein the image points BP1i, BP2i to be combined are selected in such a way that the particular feature point MP1, MP2 is assigned to a certain uniquely locatable feature M on the three-dimensional object 12 (see FIG. 2B). The feature M can be, for example, a corner ME or an edge MK on the three-dimensional object 12, which can be extracted from the entire images B1, B2 respectively and the image points BP1i, BP2i of which can be combined in the feature points MP1, MP2.

In an approximation, an object shape F12 or an object contour C12 can at least be estimated by triangulation T from the image coordinates xB, yB of the individual image points BP1i, BP2i or of the feature points MP1, MP2, which are assigned to the same object point(s) PPi or feature M in the at least two images B1, B2. For this purpose, the image coordinates xB, yB of a plurality of image points BP1i, BP2i, or a plurality of feature points MP1, MP2, can be subjected to triangulation T.

Without the knowledge of an exact base length L, that is, a distance between the different viewpoints SP1, SP2 of the mono camera 8a, the triangulation T results in unscaled object coordinates x12, y12, z12 of the three-dimensional object 12 in the environment U, which do not correspond to the actual coordinates in space. Thus, from such determined unscaled object coordinates x12, y12, z12 also only an unscaled object shape F12 or object contour C12 can be derived, which, however, is sufficient for the determination of the shape or the contour of the three-dimensional object 12. Thus, for the triangulation T, an arbitrary base length L can be assumed at first.

However, in order to make the triangulation T more accurate and to enable a determination of scaled object coordinates x12, y12, z12 and thus more accurate depth information TI with respect to the three-dimensional object 12, the actual base length L is additionally used. If, according to FIG. 2B, the relative positions and thus the base length L between the different viewpoints SP1, SP2 of the mono camera 8a at which the two images B1, B2 were recorded are known or have been determined, the absolute, actual object coordinates x12, y12, z12 (global coordinates) of the three-dimensional object 12 or of the object point PPi or of the feature M can also be determined by means of triangulation T. From this, a position and orientation, that is, a pose, of the vehicle 4 relative to the three-dimensional object 12 can be determined from geometric considerations.

In this way, the evaluation unit 9 can estimate a scaled object contour C12 or scaled object shape F12 compared to the above case, if the exact object coordinates x12, y12, z12 of several object points PPi or features M are determined. In order to determine the depth information TI even more precisely, it can be additionally provided that more than two images B1, B2 are recorded and evaluated by triangulation T as described above, and/or additionally a bundle adjustment is performed.

As already described, the three-dimensional object 12 for the SfM method is to be viewed from at least two different viewpoints SP1, SP2 by the mono camera 8a, as schematically shown in FIG. 2B. For this purpose, the mono camera 8a is to be brought into the different viewpoints SP1, SP2 in a controlled manner and, in the scaled case, it is to be determined on the basis of odometry data OD which base length L results between the viewpoints SP1, SP2 from this movement. Different methods can be used for this purpose:

If the entire vehicle 4 is in motion, this already results in a movement of the mono camera 8a. This is to be understood as meaning that the vehicle 4 as a whole is set in motion actively, for example by the drive system 4c, or passively, for example by an incline. If, during this movement, at least two images B1, B2 are recorded by the mono camera 8a within a time offset dt, the base length L can be determined with the aid of odometry data OD, from which the vehicle movement and thus also the camera movement can be derived. Odometry is therefore used to determine the two viewpoints SP1, SP2 assigned to images B1, B2.

For example, wheel speed signals S13 from active and/or passive wheel speed sensors 13 on the wheels of the vehicle 4 can be used as odometry data OD. On the basis of these, depending on the time offset dt, it can be determined how far the vehicle 4 or the mono camera 8a has moved between the viewpoints SP1, SP2, from which the base length L follows.

However, it is not absolutely necessary to resort only to vehicle odometry, that is, the evaluation of the vehicle movement on the basis of motion sensors on the vehicle 4. Use can also be made additionally or alternatively of visual odometry. In the case of visual odometry, a camera position can be continuously determined from the sensor signals S8 of the mono camera 8a or from information in the captured images B; B1, B2, insofar as, at least initially, object coordinates x12, y12, z12 of a specific object point PPi are known, for example. The odometry data OD may therefore also contain a dependency on the camera position determined in this way, since the vehicle movement between the two viewpoints SP1, SP2 or directly also the base length L can be derived from it.

In order to make the determination of the base length L by odometry more accurate during a movement of the vehicle 4, recourse can be made to further odometry data OD available in the vehicle 4. For example, a steering angle LW and/or a yaw rate G, which are determined accordingly by sensors or analytically, can be used to also take into account the rotational movement of the vehicle 4.

If the vehicle 4 is not in motion or if the motion within the time offset dt is so small that the odometry data OD are so inaccurate that a reliable determination of the base length L is thus not possible, the mono camera 8a can also be set in motion by an active actuator system 14. The movement of the mono camera 8a caused by the actuator system 14 differs from the movement of the vehicle 4 considered so far, in particular in that only the mono camera 8a or a vehicle portion connected to the mono-camera 8a is set in motion by the actuator system 14. The movement of the vehicle 4 in its entirety is therefore not changed by this, so that a stationary vehicle 4 continues to remain stationary when the actuator system 14 is actively actuated.

Thus, when the actuator system 14 is actuated, the mono camera 8a is moved directly or indirectly and thereby brought to different viewpoints SP1, SP2 so that the environment U can be imaged in at least two different images 1, B2. Thus, the SfM method can be carried out as described above. Different systems in the vehicle 4 can be considered as actuator systems 14. For example, the mono camera 8a may be arranged on a camera adjustment system 14a. In that case, the mono camera 8a can be brought into the different viewpoints SP1, SP2 in that adjusting actuator(s), pneumatic cylinders, hydraulic cylinders, servo cylinders or comparably acting actuators are adjusted by a certain adjustment distance when actuated.

Another possibility for an active actuator system 14 is an active air suspension system 14b (ECAS, Electronically Controlled Air Suspension), which ensures in a vehicle 4 via air springs configured as spring bellows that a vehicle body is adjusted in height relative to the vehicle axles of the vehicle 4, that is, is raised or lowered. If the mono camera 8a is arranged on the vehicle body of the vehicle 4, a height adjustment of the mono camera 8a can be effected by a specific control of the active air spring system 14b in order to position it at two different viewpoints SP1, SP2.

In addition, however, any comparably acting active chassis adjustment system 14c can also be used as a further active actuator system 14 and is capable of carrying out a height adjustment of the vehicle body of the vehicle 4 and thus positioning the mono camera 8a arranged thereon specifically at two different viewpoints SP1, SP2. A component adjustment system 14d is also possible, which can raise or lower only a part or component of the vehicle body to which the mono camera 8a is attached, for example a driver's cab. Other possible components include, for example, aerodynamic components, such as aerodynamic wings or spoilers, to which a mono camera 8a can be mounted and which can be actively adjusted to selectively adjust the mono camera 8a.

Thus, there are a range of possibilities to actively and selectively position the mono camera 8a at different viewpoints SP1, SP2 to record at least two images B1, B2 of a three-dimensional object 12 and to determine therefrom the corresponding depth information TI (scaled or unscaled) for one or more object points PPi, from which a scaled or unscaled object contour C12 or object shape F12 can be derived subsequently.

In a second step ST2 of the method according to the disclosure, a classification of the detected three-dimensional object 12 into a certain object class Kn and/or a determination of a pose PO, that is, a position and orientation of the vehicle 4 relative to the object 12, is then carried out on the basis of the scaled or unscaled object contour C12 or object shape F12. By a comparison with known objects, it can thereby be recognized, for example, whether a ramp 3, a parked trailer 12a, a swap body 12b, a bulk material location 12d, a container 12e, et cetera, have been recorded by the mono camera 8a and/or how they are located relative to the vehicle 4.

Correspondingly, this classification, locating and recognition can also be carried out in the case of an image of the environment U recorded with a stereo camera 8b, wherein an object contour C12 or object shape F12 can also be derived from these stereoscopic recordings or images B in an analogous manner by triangulation T. However, an object contour C12 or an object shape F12 can also be derived from the sensor signals S8 of the LIDAR sensor 8d, the time-of-flight camera 8e, the structured-light camera 8f or the imaging radar sensor 8g by an evaluation of the propagation measurement LM of the particular electromagnetic radiation EMa, EMb, on the basis of which a three-dimensional object 12 can be classified, located and recognized.

If a three-dimensional object 12 has been classified in this way in an object class Kn in which the target object 12Z is also to be classified, an identification of the three-dimensional object 12 follows in a third step ST3 and also a check as to whether this recognized three-dimensional object 12 is the target object 12Z assigned to the vehicle 4, for example by the management system 5a or by the dispatcher 5b. This serves to determine whether the vehicle 4 can or may perform the task assigned to it at the three-dimensional object 12, that is, load or unload a cargo F at a particular ramp 3, couple to a particular parked trailer 12a, maneuver under a particular swap body 12b, or approach a bulk material location 12d or a container 12e, et cetera.

For this purpose, after the recognition and classification of the three-dimensional object 12, it is checked whether a specific object identifier ID12 is assigned to it, wherein the object identifier ID12 can be implemented differently. In general, the object identifier ID12 is to be formed in such a way that it can be determined from the vehicle 4 whether the three-dimensional object 12, which can be identified via the object identifier ID12, corresponds to the allocated target object 12Z, which is to be identified via a corresponding target identifier IDZ.

To this end, the environment detection system 7 can be used to check, for example, on the basis of the sensor signals S8 whether, as a two-dimensional object 11 for example, there is a 2D marker 11b, for example in the form of letters 15a, numbers 15b, QR codes 15c, Aruco markers 15d, et cetera, on or adjacently to the particular three-dimensional object 12, or whether, as a three-dimensional object 12, there is a 3D marker 12c, for example a spherical marker, as an object identifier ID12. This can be done by image processing. If such a 2D marker 11b or 3D marker 12c has been recognized, it can thus be compared with the target identifier IDZ transmitted to the vehicle 4 by, for example, the management system 5a or the dispatcher 5b. In this way, it can be checked whether or not the recognized three-dimensional object 12 on the depot 1 has been allocated to the vehicle 4 as a target object 12Z.

Alternatively, with the aid of the environment detection system 7, in the case of a recognized ramp 3 as a three-dimensional object 12, an opening state Z of the ramp 3 can also be checked as an object identifier ID12. Accordingly, when the vehicle 4 arrives at the depot 1, the management system 5a or the dispatcher 5b can also automatically open a ramp gate 3a of a ramp 3 and thereby allocate a ramp 3 to the vehicle 4. The target indicator IDZ in the case is therefore an open ramp gate 3a. This can be detected by the environment detection system 7 and recognized, for example, on the basis of the images B captured by the mono camera 8a or the stereo camera 8b by triangulation T or on the basis of the propagation measurement LM performed via the LIDAR sensor 8d, the time-of-flight camera 8e, the structured-light camera 8f or the imaging radar sensor 8g, since an open ramp gate 3a produces different depth information TI than a closed ramp gate 3a.

If the identification was not successful, that is, if no ramp 3 or no parked trailer 12a or no swap body 12b, or no bulk material location 12d or no container 12e was recognized that was assigned to the vehicle 4 by the management system 5a or by the dispatcher 5b, an intermediate search routine SR (FIG. 3) is first performed. This can be structured as follows:

If it has been recognized by means of the object identifier ID12 that the recognized three-dimensional object 12, that is, the ramp 3 or the trailer 12a or the swap body 12b, or the bulk material location 12d or the container 12e is not the allocated three-dimensional target object 12Z, adjacent three-dimensional objects 12 in the depot 1 are evaluated in the same way as described above in steps ST1 and ST2 and it is checked for these according to the third step ST3 whether the object identifier ID12 corresponds to the target indicator IDZ.

For this purpose, the vehicle 4 travels along the depot 1 in a specific direction of travel FR, controlled in an automated manner or manually, in order to be able to successively detect the adjacent three-dimensional objects 12 via the environment detection system 7, until the allocated three-dimensional target object 12Z with the particular target identifier IDZ is detected. The direction of travel FR of the vehicle 4 can be defined here on the basis of the detected object identifier ID12 in order to arrive at the allocated three-dimensional target object 12Z in the most efficient manner possible.

If, in the third step ST3, for example, an object identifier ID12 has been determined that has a lower ranking order than the allocated target identifier IDZ, the vehicle 4 is moved in an automated manner or manually in a direction of travel FR in which the object identifier ID12 also increases, insofar as a ranking order can be determined for the object identifier ID12. Accordingly, the vehicle 4 is controlled in such a way that it moves, for example, in the direction of larger numerical values or towards higher letter "values" on the object identifiers ID12. By observing the object identifier ID12, it can be quickly recognized whether the vehicle is being steered in the correct direction of travel FR. For plausibility checking, it can be counted whether the sequence of numbers 15b or letters 15a is correct. From this, it can be estimated how far there is still to travel until the allocated target object 12Z, for example the allocated ramp 3 or the allocated trailer 12a or the allocated swap body 12b or the allocated bulk material location 12d or the allocated container 12e is reached.

Correspondingly, this applies to the opposite case where, for the recognized three-dimensional object 12, an object identifier ID12 which has a higher ranking order than the allocated target identifier IDZ is determined. The opposite direction of travel FR is then to be selected correspondingly.

In the case of manual control of the vehicle 4, travel instructions AF, in particular the direction of travel, can be given via the display device 20 in order to perform the search routine SR.

The execution of the preceding steps ST0, ST1, ST2, ST3 as well as the search routine SR can take place in the travel control unit 6, which can be embodied as an independent control unit or is part of the evaluation unit 9 or which includes the evaluation unit 9 or exchanges signals there-with. The travel control unit 6 can also be part of or include other functional units in the vehicle 4.

After the allocated three-dimensional target object 12Z has been successfully determined, in a subsequent fourth step ST4 an approach signal SA is generated in the travel control device 6, depending on which the vehicle 4 is maneuvered in a targeted manner along a specified trajectory TR to the allocated three-dimensional target object 12Z. This can be controlled in an automated manner or manually. In the case of manual control of the vehicle 4, travel instructions AF are output to the driver via the display device 20 depending on the approach signal SA, so that the driver can follow the trajectory TR to enable the vehicle 4 to be moved closer to the three-dimensional target object 12Z manually.

According to FIG. 1, the trajectory TR can have a starting point TR1, to which the vehicle 4 is initially maneuvered in a certain orientation after successful identification in step ST3. This starting point TR1 is in particular dependent on the object class Kn and/or also the determined pose PO of the three-dimensional target object 12Z as well as also dependent on the vehicle 4, in particular a coupled trailer, itself. Also, the trajectory TR is dependent on the type of the particular three-dimensional target object 12Z and its pose PO and also dependent on the vehicle 4, in particular a coupled trailer 4a, itself. Both the trajectory TR and the starting point TR1 are defined by the travel control device 6.

The starting point TR1 and/or the trajectory TR can be selected for a ramp 3 as a three-dimensional target object 12Z depending on a two-dimensional object 11 that is uniquely assigned to the ramp 3. This can be, for example, one, two or more lines 11a on the ground 17 in front of the ramp 3 (FIG. 1) or to the side of the ramp 3 on the building 2 (see FIG. 1A). From the images B of the mono camera 8a or the stereo camera 8b, it can be determined, for example, whether these lines 11a are aligned with the ramp 3 at a 90° angle, so that a starting point TR1 can be defined on this basis. This information can also be obtained from the sensor signals S8 of the LIDAR sensor 8d, the time-of-flight camera 8e, the structured-light camera 8f or the imaging radar sensor 8g. However, the trajectory TR can also be defined depending on the location of these lines 11a, so that a manual or automated orientation can be performed on the basis of these lines 11a during the approach process.

From the images B of the mono camera 8a (SfM method) or from the images of the stereo camera 8b (triangulation T) or from the sensor signals S8 of the LIDAR sensor 8d, the time-of-flight camera 8e, the structured-light camera 8f or the imaging radar sensor 8g (propagation measurement LM), a position or an orientation or both, that is, the pose PO, of the ramp 3 relative to the vehicle 4 can then be continuously determined so that a suitable trajectory TR can be determined for the vehicle 4, along which the vehicle 4 can approach the ramp 3 in an automated manner or manually.

Similarly, a starting point TR1 and a trajectory TR for the approach to a trailer 12a or under a swap body 12b or to a bulk material location 12d or a container 12e can be carried out as a target object 12Z, wherein in this case instead of the lines 11a a virtual line 18 (see FIG. 1) can be determined for orientation and, for example, represents an extension of a center axis 19 of the trailer 12a or the swap body 12b, or the bulk material location 12d or the container 12e or which lies parallel to the particular center axis 19. On this basis, the approach process can then be carried out starting from a specific starting position TR1 along a defined trajectory TR.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

1 depot
2 building
3 ramp
3a ramp gate
4 vehicle
4a steering system
4b brake system
4c drive system
4d coupled trailer
5a management system
5b dispatcher
6 travel control unit
7 environment detection system
8 sensor
8a mono camera
8b stereo camera
8c infrared sensor
8d LIDAR sensor
8e time-of-flight camera
8f structured light camera
8g imaging radar sensor
9 evaluation unit
10 object
11 two-dimensional object
11a lines
11b 2D markers
11c signs
12 three dimensional object
12a parked trailer
12b swap body
12c 3D marker
12d bulk material location
12e container
12Z target object
13 wheel speed sensor
14 actuator system
14a camera adjustment system
14b air suspension system
14c chassis adjustment system
14d component adjustment system
15a letter
15b number
15c QR code
15d Aruco marker
17 ground
18 virtual line
19 center axis
20 display device
AF travel direction
B image
B1 first image
B2 second image
BP1$i$ first image point
BP2$i$ second image point
C12 object contour
D4 driving dynamics of the vehicle 4
dt time offset
E8 detection range of the sensor 8

EMa emitted electromagnetic radiation
EMb reflected electromagnetic radiation
F cargo
F12 object shape
FR direction of travel
G yaw rate
ID12 object identifier
IDZ target identifier
Kn object class
L base length
LM propagation measurement
M feature
ME corner
MK edge
MP1, MP2 feature point
OD odometry data
PO pose
PPi object point on the three-dimensional object 12
S8 sensor signal
S13 wheel speed signal
SA approach signal
SP1, SP2 first, second viewpoint of mono camera 8a
SR search routine
T triangulation
TR trajectory of the vehicle 4
TR1 starting point of the trajectory TR
TI depth information
U environment
xB, yB image coordinates
x11, y12, z12 object coordinates
Z opening state of the ramp gate 3a
ST0, ST1, ST2, ST3, ST4 steps of the method

What is claimed is:

1. A method for controlling a vehicle in a depot, the method comprising the steps of:
    allocating a three-dimensional target object to the vehicle;
    detecting a three-dimensional object in an environment (U) around the vehicle and determining depth information (TI) for the detected three-dimensional object;
    classifying the detected three-dimensional object on the basis of the determined depth information (TI) and checking whether the determined three-dimensional object has a same object class (Kn) as the three-dimensional target object;
    if the determined three-dimensional object has the same object class (Kn) as the three-dimensional target object, then identifying the detected three-dimensional object by detecting an object identifier assigned to the three-dimensional object and checking whether the detected object identifier matches a target identifier assigned to the target object, wherein the object identifier identifies the three-dimensional object to which it is assigned independent of a location of the detected three-dimensional object; and,
    outputting an approach signal (SA) to move the vehicle closer to the detected three-dimensional target object in an automated manner or manually if the object identifier matches the target identifier.

2. The method of claim 1, wherein the three-dimensional target object is a ramp for loading or unloading a cargo (F) or is a parked trailer or a swap body or a bulk material storage location or a container.

3. The method of claim 1, wherein:
    the three-dimensional object in the environment (U) around the vehicle is detected via at least one of the following: at least one mono camera; and, at least one stereo camera; and,
    wherein the determination of depth information (TI) of the detected three-dimensional object follows by triangulation (T) from at least two recorded images (B), wherein the images (B) are recorded with at least one of the following: the at least one mono camera; and, the at least one stereo camera from at least two different viewpoints.

4. The method of claim 3, wherein the at least one mono camera is brought into the at least two different viewpoints by at least one of the following: via a change controlled in an automated manner in driving dynamics of the entire vehicle; and, via an actuator system, wherein the actuator system can adjust the at least one mono camera into the different viewpoints independently of the driving dynamics of the vehicle.

5. The method of claim 1, wherein the three-dimensional object in the environment (U) around the vehicle is detected via at least one of: a LIDAR sensor; a time-of-flight camera; a structured-light camera; and, an imaging radar sensor; wherein the depth information (TI) of the detected three-dimensional object is determined by a propagation measurement (LM) of emitted electromagnetic radiation (EMa) and reflected electromagnetic radiation (EMb), with which a detection range of the at least one of: the LIDAR sensor; the time-of-flight camera; the structured-light camera; and, the imaging radar sensor is scanned.

6. The method of claim 1, wherein at least one of the following applies:
    an object shape; and,
    an object contour of the detected three-dimensional object is determined on the basis of the depth information (TI); and,
    the object class (Kn); and,
    a pose (PE) relative to the vehicle
is assigned to the detected three-dimensional object depending on at least one of the following: the object shape and the object contour.

7. The method of claim 1, wherein the object identifier is detected by a sensor.

8. The method of claim 7, wherein, as the object identifier, at least one of the following is detected:
    a 2D marker including a letter and/or a number and/or a QR code and/or an Aruco marker; and,
    a 3D marker; and,
    wherein the 2D marker and/or the 3D marker is located on or adjacently to the detected three-dimensional object.

9. The method of claim 7, wherein an opening state (Z) of a ramp gate of a ramp is detected as the object identifier if a ramp is detected as the three-dimensional object and an opened ramp gate can be specified as the target identifier for the target object.

10. The method of claim 7, wherein a 3D marker is detected as the object identifier; and, the 3D marker is located on or adjacently to the detected three-dimensional object.

11. The method of claim 1, wherein the object identifier matches the target identifier when they contain a same information.

12. The method of claim 1, wherein a search routine (SR) is performed if the object identifier of the determined object does not match the target identifier of the target object; and, wherein, as part of the search routine (SR), successive further three-dimensional objects are detected, classified and identified in the depot until the object identifier of the detected three-dimensional object matches the target identifier of the target object.

13. The method of claim 12, wherein the vehicle is moved in the automated manner and/or manually in a direction of travel (FR) as part of the search routine (SR) in order to detect the successive further three-dimensional objects, wherein the direction of travel (FR) is defined depending on the detected object identifier which does not match the target identifier, in such a way that object identifiers for three-dimensional objects which approximate the target identifier are determined in ascending or descending ranking order.

14. The method of claim 1, wherein the vehicle is controlled in the automated manner or manually along a specified trajectory (TR) depending on the approach signal (SA) via at least one of the following: a drive system; a brake system; and, a steering system to approach the three-dimensional target object.

15. The method of claim 14, wherein the vehicle is first controlled in the automated manner or manually to a starting point of the trajectory (TR) after the approach signal (SA) has been outputted.

16. The method of claim 14, wherein the trajectory (TR) and/or the starting point is dependent on the object class (Kn) and/or a pose (PO) of the three-dimensional target object and is dependent on at least one of: the vehicle and a coupled trailer.

17. The method of claim 14, wherein the trajectory (TR) is specified depending on a line assigned to the three-dimensional target object.

18. The method of claim 14, wherein, in the case of manual control of the vehicle, travel instructions (AF) are output via a display device depending on the approach signal (SA) to allow the vehicle to be moved closer to the three-dimensional target object manually.

19. The method of claim 1 further comprising:
determining an object contour of the detected three-dimensional object on the basis of the depth information (TI); and,
the object class (Kn); and,
a pose (PE) relative to the vehicle
is assigned to the detected three-dimensional object depending on the object contour.

20. A travel control unit comprising:
a processor;
a computer readable storage medium having program code stored on the computer readable storage medium;
said program code being configured, when executed by said processor, to:
detect a three-dimensional object in an environment (U) around the vehicle and determine depth information (TI) of the detected three-dimensional object;
classify the detected three-dimensional object on the basis of the determined depth information (TI) and check whether the determined three-dimensional object has a same object class (Kn) as a three-dimensional target object allocated to the vehicle;
if the determined three-dimensional object has the same object class (Kn) as the three-dimensional target object, identify the detected three-dimensional object by detecting an object identifier assigned to the three-dimensional object and checking whether the detected object identifier matches a target identifier assigned to the target object, wherein the object identifier identifies the three-dimensional object to which it is assigned independent of a location of the detected three-dimensional object; and,
output an approach signal (SA) to move the vehicle closer to the detected three-dimensional target object in an automated manner or manually if the object identifier matches the target identifier.

21. The travel control unit of claim 20, wherein the travel control unit is further configured to influence driving dynamics of the vehicle in the automated manner depending on the approach signal (SA).

22. The travel control unit of claim 20, wherein the travel control unit is further configured to influence driving dynamics of the vehicle in the automated manner depending on the approach signal (SA) via at least one of the following: a steering system, a braking system and a drive system of the vehicle.

23. The travel control unit of claim 20, wherein the travel control unit is further designed to control a display device depending on the approach signal (SA) to display travel instructions on a display device depending on the approach signal (SA) to allow the vehicle to be moved closer to the three-dimensional target object manually.

24. A vehicle comprising:
a travel control unit for controlling the vehicle in an automated manner or manually depending on an approach signal (SA);
said travel control unit including a processor;
a computer readable storage medium having program code stored on the computer readable storage medium;
said program code being configured, when executed by said processor, to:
detect a three-dimensional object in an environment (U) of a vehicle and determine depth information (TI) of the detected three-dimensional object;
classify the detected three-dimensional object on the basis of the determined depth information (TI) and check whether the determined three-dimensional object has a same object class (Kn) as a three-dimensional target object allocated to the vehicle;
if the determined three-dimensional object has the same object class (Kn) as the three-dimensional target object, then identify the detected three-dimensional object by detecting an object identifier assigned to the three-dimensional object and check whether the detected object identifier matches a target identifier assigned to the target object, wherein the object identifier identifies the three-dimensional object to which it is assigned independent of a location of the detected three-dimensional object; and,
output an approach signal (SA) to move the vehicle closer to the detected three-dimensional target object in the automated manner or manually if the object identifier matches the target identifier.

* * * * *